O-ALKYLTYROSINE ESTERS

Henry Marcell Kissman, Nanuet, N. Y., Joseph Peter Joseph, Cliffside Park, N. J., and Bernard Randall Baker, Birmingham, Ala., assignors to American Cyanamid Company, New York, N. Y., a corporation of Delaware No Drawing. Application March 5, 1956
Serial No. 569,225

6 Claims. (Cl. 260—471)

This invention relates to new organic compounds and more particularly is concerned with novel O-alkyl tyrosine esters which may be represented by the following general formula:

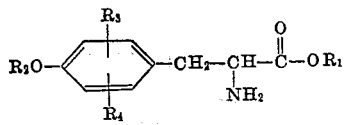

wherein $R_1$ is a member of the group consisting of alkyl radicals such as 5-methyl-5-hexenyl alkenyl radicals such as 2-methoxyethyl, etc., haloalkoxyalkyl radicals such as chloroethyl, chlorobutyl, etc., cycloalkyl radicals, such as cyclohexyl, mononuclear aryl substituted lower alkyl radicals such as benzyl, phenethyl, etc., and mononuclear heterocyclic substituted lower alkyl radicals such as tetrahydrofurfuryl; $R_2$ is an alkyl radical such as methyl, ethyl, propyl, butyl, hexyl, etc.; and $R_3$ and $R_4$ are members of the group consisting of hydrogen atoms, halogen atoms, nitro and amino radicals. With the proviso that when $R_3$ and $R_4$ are both hydrogen and $R_1$ and $R_2$ are unsubstituted and saturated, the sum of the carbon atoms of $R_1$ and $R_2$ is at least seven. The invention also includes the acid addition salts of the compounds such as the hydrochloride salts.

The compounds of this invention have considerable activity against a variety of microorganisms. When tested in accordance with the standard agar dilution technique, the compounds exhibit activity against such microorganisms as *Candida albicans, Saccharomyces carlsbergensis, Mucor ramannianus, Fusarium episphaeria, Hormodendrum cladosporoides, Trichophyton mentagrophytes, Botrytis cinerea, Aspergillus fumigatus, Microsporum gypseum, Penicillium digitatum, Mycobacterium,* and also against bacterial microorganisms such as the mycrococci, for example *Staphylococcus 69, Staphylococcus aureus* and *Sarcina lutea;* the streptococci, for example, *Streptococcus* γ No. 11 and *Streptococcus* β No. 80; the bacilli, for example, *Bacillus subtilis* and the mycobacteria, for example, Mycobacterium 607. Samples of the compounds were prepared in serial dilutions in agar and sterilized. The molten agar was poured into plates, allowed to harden and a standard culture of each of the organisms against which the samples were to be tested was streaked on the surface of the plates. Alternatively the samples were mixed with .5 ml. of ethanol and added to 12 ml. of sterile 5% aqueous solution of sodium carboxymethylcellulose. Samples of the resulting solution or suspension were then prepared in serial dilutions and to these samples was added sterile molten agar aseptically. It was found that the new compounds completely inhibit the growth of the above mentioned microorganisms in concentrations as low as 0.008 mgm. per ml. of agar.

The compounds of this invention may be prepared by reacting an appropriate N-formyltyrosine with a suitable alkylating agent, such as dimethyl sulfate, or an alkyl halide e. g. methyl iodide, in the presence of sodium methoxide in methanol. When dimethyl sulfate or methyl iodide are used obviously only O-methyl-N-formyltyrosine is produced. The intermediate O-alkyl-N-formyltyrosines are then subjected to a deformylation reaction by heating with hydrochloric acid solution. The O-alkyltyrosine hydrochloride so produced is then esterified in a standard manner, i. e. reaction with acetyl chloride in an appropriate alcohol to produce the final compounds of this invention.

The preparation of the novel compounds may be illustrated schematically below wherein $R_1$, $R_2$, $R_3$ and $R_4$ have the meaning indicated above.

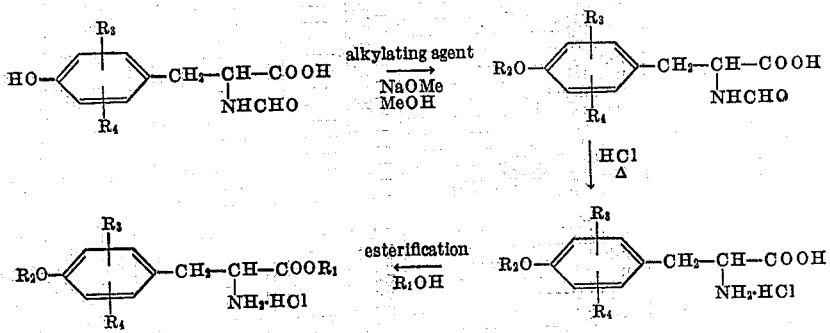

The invention will be described in greater detail in conjunction with the following specific examples in which the parts are by weight unless otherwise specified.

EXAMPLE 1

*O-ethyl-N-formyl-L-tyrosine*

N-formyl-L-tyrosine (5.0 parts) was added to a solution of 2.7 parts of sodium methoxide in 50 parts by volume of methanol. After nearly all of the solid was dissolved, 3.9 parts of ethyl iodide was added to the mixture, which was then refluxed for three hours on the steam bath. The solvent was then removed under reduced pressure on the steam bath. The residue was made acid to litmus paper by addition of 6 N nitric acid, and the undissolved solids were collected by filtration, washed thoroughly with ice water, and dried in the air. This crude product was recrystallized from methanol-water to give 2.4 parts of purified product melting at 170–171° C.

EXAMPLE 2

Following the procedure of the preceding example, the following compounds were prepared: O-methyl-N-formyl-L-tyrosine, O-n-propyl-N-formyl-L-tyrosine (M. P. 154–156°), O-n-butyl-N-formyl-L-tyrosine (M. P. 153–154°), O-n-hexyl-N-formyl-L-tyrosine (M. P. 160–161°).

EXAMPLE 3

O-methyl-N-formyl-3-nitro-L-tyrosine

N-formyl-3-nitro-L-tyrosine (38.0 parts) was dissolved in 75 parts by volume of 4 N sodium hydroxide solution. To the chilled, stirred solution there was added in five equal portions 60 parts by volume of 4 N sodium hydroxide solution and 47.6 parts of dimethyl sulfate. The solution was acidified with 8 N nitric acid solution. The crystals that separated from the aqueous media were collected by filtration and dried to give 33.2 parts of an orange solid melting at 73–76°.

EXAMPLE 4

Following the procedure of the preceding example O-methyl-N-formyl-3,5-diiodo-L-tyrosine (M. P. 182–183°) was prepared.

EXAMPLE 5

O-n-propyl-L-tyrosine hydrochloride

O-propyl-N-formyl-L-tyrosine (26.0 parts) was suspended in 400 parts by volume of 3 N hydrochloric acid and the mixture was heated on a steam bath until the suspended solids were in solution. Three parts of activated charcoal was stirred with the solution for about 10 minutes, and the mixture was filtered out. The product crystallized when the filtrate cooled and was collected by filtration. 13.1 parts of product melting at 220–223° C. (dec.) was obtained. An additional 1.8 parts was obtained from the concentrated filtrate.

EXAMPLE 6

Following the procedure of the preceding example, the following compounds were prepared: O-ethyl-L-tyrosine hydrochloride (M. P. 220–222°), O-methyl-L-tyrosine hydrochloride, O-n-butyl-L-tyrosine hydrochloride (M. P. 231–232°), O-n-hexyl-L-tyrosine hydrochloride (M. P. 213–213°), O-methyl-3,5-diiodo-L-tyrosine hydrochloride (M. P. 218–220°), O-methyl-3-nitro-L-tyrosine hydrochloride (M. P. 220–223°).

EXAMPLE 7

O-methyl-L-tyrosine 2-methoxyethyl ester hydrochloride 20.0 parts of O-methyl-L-tyrosine hydrochloride was suspended in 150 parts by volume of methyl Cellosolve, and 10 parts by volume of acetyl chloride was added. This mixture was refluxed until solution was complete. The solution was then concentrated under vacuum on a steam bath, leaving a solid residue. This residue was recrystallized from chloroform-ether to give 17.0 parts of purified product melting at 156–157°.

EXAMPLE 8

O-methyl-L-tyrosine octyl ester hydrochloride 20 parts of O-methyl-L-tyrosine hydrochloride was suspended in 50 parts by volume of octyl alcohol, and 20 parts by volume of acetyl chloride was added. This mixture was allowed to reflux for five hours, after which another 10 parts by volume of acetyl chloride was added and refluxing was continued until solution was complete. The reaction solution was then concentrated under vacuum on a steam cone to remove the more volatile material. The resulting solution was then cooled, and about 100 parts by volume of ether was added, causing the crude product to precipitate. This material was collected by filtration and recrystallized from chloroform-ether solution, giving 18.3 parts of product melting at 120–122° C.

EXAMPLE 9

Following the procedure of Example 8 the compounds tabulated below were prepared. The melting points represent hydrochloride salts.

| R₁ | R₂ | R₃ | R₄ | Name | M. P., °C. |
|---|---|---|---|---|---|
| n-hexyl | —OH₃ | H | H | O-methyl-L-tyrosine n-hexyl ester | 141–142 |
| cyclohexyl | —OH₃ | H | H | O-methyl-L-tyrosine cyclohexyl ester | 202.0–202.5 |
| 5-methylhexyl-1 | —OH₃ | H | H | O-methyl-L-tyrosine 5-methylhexyl-1 ester | 124–126 |
| n-heptyl | —OH₃ | H | H | O-methyl-L-tyrosine n-heptyl ester | 135–136.5 |
| n-octyl | —OH₃ | H | H | O-methyl-L-tyrosine n-octyl ester | 120–122 |
| n-nonyl | —OH₃ | H | H | O-methyl-L-tyrosine n-nonyl ester | 130–133 |
| n-decyl | —OH₃ | H | H | O-methyl-L-tyrosine n-decyl ester | 116–120 |
| n-undecyl | —OH₃ | H | H | O-methyl-L-tyrosine undecyl ester | 131–132 |
| n-octadecyl | —OH₃ | H | H | O-methyl-L-tyrosine n-octadecyl ester | 127–128 |
| 2-chloroethyl | —OH₃ | H | H | O-methyl-L-tyrosine 2-chloroethyl ester | 207–210 |
| 4-chlorobutyl | —OH₃ | H | H | O-methyl-L-tyrosine 4-chlorobutyl ester | 164.5–165.5 |
| 2-methoxyethyl | —OH₃ | H | H | O-methyl-L-tyrosine 2-methoxyethyl ester | 156–157 |
| tetrahydrofurfuryl | —OH₃ | H | H | O-methyl-L-tyrosine tetrahydrofurfuryl ester | 171–172.5 |
| 2-(2'-butoxyethoxy)ethyl | —OH₃ | H | H | O-methyl-L-tyrosine 2-(2'-butoxyethoxy)ethyl ester | 148–153 |
| benzyl | —OH₃ | H | H | O-methyl-L-tyrosine benzyl ester | 204–205 |
| 2-phenylethyl | —OH₃ | H | H | O-methyl-L-tyrosine 2-phenylethyl ester | 172–173.5 |
| n-butyl | n-butyl | H | H | O-n-butyl-L-tyrosine n-butyl ester | 129.5–130 |
| n-amyl | n-butyl | H | H | O-n-butyl-L-tyrosine n-amyl ester | 129–131 |
| n-butyl | n-propyl | H | H | O-n-propyl-L-tyrosine n-butyl ester | 132–133 |
| n-amyl | n-propyl | H | H | O-n-propyl-L-tyrosine n-amyl ester | 131–133 |
| n-hexyl | n-propyl | H | H | O-n-propyl-L-tyrosine n-hexyl ester | 134–136 |
| n-propyl | n-hexyl | H | H | O-n-hexyl-L-tyrosine n-propyl ester | 139.5–141.0 |
| n-butyl | n-hexyl | H | H | O-n-hexyl-L-tyrosine n-butyl ester | 119–120 |
| n-amyl | n-hexyl | H | H | O-n-hexyl-L-tyrosine n-amyl ester | 122–124 |
| n-hexyl | n-hexyl | H | H | O-n-hexyl-L-tyrosine n-hexyl ester | 107–108 |
| n-butyl | —OH₃ | 3-Cl | H | O-methyl-3-chloro-L-tyrosine n-butyl ester | 179–180 |
| n-butyl | —OH₃ | 3-I | 5-I | O-methyl-3,5-diiodo-L-tyrosine n-butyl ester | 141–143 |
| n-amyl | —OH₃ | 3-I | 5-I | O-methyl-3,5-diiodo-L-tyrosine n-amyl ester | 133–134 |
| n-hexyl | —OH₃ | 3-I | 5-I | O-methyl-3,5-diiodo-L-tyrosine n-hexyl ester | 127–128 |
| n-butyl | —OH₃ | 3-nitro | H | O-methyl-3-nitro-L-tyrosine n-butyl ester | 95–97.5 |
| n-butyl | —OH₃ | 3-amino | H | O-methyl-3-amino-L-tyrosine n-butyl ester | 225 |
| 3,7-dimethyloctyl | —OH₃ | H | H | O-methyl-L-tyrosine-3,7-dimethyloctyl ester | 121–123 |
| 5-methyl-5-hexenyl | —OH₃ | H | H | O-methyl-L-tyrosine 5-methyl-5-hexenyl ester | 107–109 |

EXAMPLE 10

O-methyl-3-chloro-L-tyrosine hydrochloride

To a solution of 5 parts of O-methyl-N-acetyl-L-tyrosine in 25 parts by volume of acetic acid at 50° was added dropwise 1.8 parts by volume of sulfuryl chloride. The temperature was maintained at 50–55°. Thereafter the solution was evaporated to dryness under reduced pressure. The residue was dissolved in 25 parts by volume of hot 6 N hydrochloric acid and heated on the steam bath for 2 hours. Crystals began to separate. The mixture was cooled in an ice-bath. The product was collected on a sintered-glass funnel and washed with ice cold 6 N hydrochloric acid until the washings were colorless; yielding a rose colored solid, M. P. 225–230° dec. with sintering at 215°. The product was dissolved in 20 parts of hot water and the solution clarified with 1 part of charcoal by heating on the steam bath for ten minutes. To the reheated filtrate there was added 20 parts by volume of 12 N hydrochloric acid. Cooling gave white crystals of the pure product, M. P. 235° dec. with sintering at 215°.

We claim:
1. Compounds selected from the group consisting of O-alkyl-L-tyrosine esters of the formula:

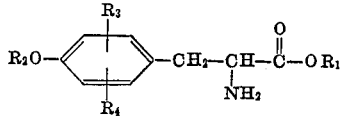

wherein $R_1$ is a member of the group consisting of alkyl radicals, lower alkenyl radicals, lower alkoxy lower alkyl radicals, halo-substituted lower alkyl radicals, cycloalkyl radicals, phenyl lower alkyl radicals, and tetrahydrofurfuryl radical; $R_2$ is a lower alkyl radical; $R_3$ and $R_4$ are members of the group consisting of hydrogen atoms, halogen atoms, nitro and amino radicals with the proviso that when $R_3$ and $R_4$ are both hydrogen and $R_1$ and $R_2$ are unsubstituted and saturated, the sum of the carbon atoms of $R_1$ and $R_2$ is at least seven; and acid addition salts thereof.

2. O-methyl-L-tyrosine nonyl ester.
3. O-methyl-L-tyrosine octyl ester.
4. O-hexyl-L-tyrosine butyl ester.
5. O-butyl-L-tyrosine butyl ester.
6. O-methyl-L-tyrosine decyl ester.

References Cited in the file of this patent
UNITED STATES PATENTS
2,680,762    Dickson _____ June 8, 1954

OTHER REFERENCES
Beilstein, 14 613 (1931); 372 (1951).

UNITED STATES PATENT OFFICE
CERTIFICATE OF CORRECTION

Patent No. 2,833,810 May 6, 1958

Henry Marcell Kissman et al.

It is hereby certified that error appears in the above numbered patent requiring correction and that the said Letters Patent should read as corrected below.

In the grant, lines 4 and 5, and in the heading to the printed specification, lines 6 and 7, state of incorporation, for "a corporation of Delaware" read -- a corporation of Maine --.

Signed and sealed this 25th day of November 1958.

(SEAL)
Attest:

KARL H. AXLINE
Attesting Officer

ROBERT C. WATSON
Commissioner of Patents